(12) United States Patent
Carroll et al.

(10) Patent No.: US 12,172,069 B2
(45) Date of Patent: Dec. 24, 2024

(54) ACCESSORY HOLDER FOR ATTACHING AN ACCESSORY TO A SURFACE

(71) Applicant: Stick Rock Solutions LLC, Tulsa, OK (US)

(72) Inventors: Chad Nathan Carroll, Tulsa, OK (US); Ryan Siemens, Owasso, OK (US)

(73) Assignee: Stick Rock Solutions LLC, Tulsa, OK (US)

( * ) Notice: Subject to any disclaimer, the term of this patent is extended or adjusted under 35 U.S.C. 154(b) by 335 days.

(21) Appl. No.: 17/645,907

(22) Filed: Dec. 23, 2021

(65) Prior Publication Data

US 2022/0203211 A1    Jun. 30, 2022

Related U.S. Application Data

(60) Provisional application No. 63/199,429, filed on Dec. 28, 2020.

(51) Int. Cl.
*A63C 11/00* (2006.01)
*F16M 13/02* (2006.01)

(52) U.S. Cl.
CPC ............ *A63C 11/00* (2013.01); *F16M 13/02* (2013.01)

(58) Field of Classification Search
CPC ................................ A63C 11/00; F16M 13/02
USPC ......................................................... 280/821
See application file for complete search history.

(56) References Cited

U.S. PATENT DOCUMENTS

| | | | | |
|---|---|---|---|---|
| 2,455,920 | A * | 12/1948 | Ebbley, Jr. | A63C 5/065 280/817 |
| 2,490,183 | A * | 12/1949 | Wheeler | A63C 5/06 280/809 |
| 3,199,886 | A * | 8/1965 | George | A63C 11/24 135/84 |
| 3,826,518 | A * | 7/1974 | Hennig | A63C 5/061 280/813 |
| 3,885,805 | A * | 5/1975 | Solymosi | A63C 5/16 280/817 |
| 3,951,421 | A * | 4/1976 | Brangenberg | A63C 5/065 280/817 |
| 4,006,911 | A * | 2/1977 | Kraus | A63C 5/06 280/809 |
| 4,175,683 | A * | 11/1979 | Shields | A63C 11/22 294/147 |
| 4,793,627 | A * | 12/1988 | Monreal | A63C 5/06 280/823 |
| 4,795,183 | A * | 1/1989 | Reuters | A63C 7/108 280/605 |
| 8,439,401 | B2 * | 5/2013 | Groves | E01F 9/623 52/103 |
| 8,505,975 | B2 * | 8/2013 | Karlof | A63C 11/228 280/809 |
| 8,544,890 | B2 * | 10/2013 | Whitehead | A63C 5/06 280/809 |

(Continued)

*Primary Examiner* — Hau V Phan
(74) *Attorney, Agent, or Firm* — Cozen O'Connor

(57) ABSTRACT

An accessory holder includes a base portion configured to mount to a mounting surface. The accessory holder further includes an extension extending from the base portion and having a channel defined therein. The channel is configured to receive an accessory. The accessory may be a ski pole where the mounting surface is a snow sport equipment.

15 Claims, 11 Drawing Sheets

(56) References Cited

U.S. PATENT DOCUMENTS

| | | | |
|---|---|---|---|
| 8,973,946 B2* | 3/2015 | Carr | A63C 11/24 |
| | | | 81/3.09 |
| 9,126,100 B2* | 9/2015 | Spehar | A63B 69/18 |
| 2011/0079994 A1* | 4/2011 | Whitehead | A63C 5/06 |
| | | | 280/821 |
| 2013/0146110 A1* | 6/2013 | Heim | F16F 15/02 |
| | | | 135/65 |
| 2015/0084324 A1* | 3/2015 | Spehar | A63C 11/10 |
| | | | 280/819 |

* cited by examiner

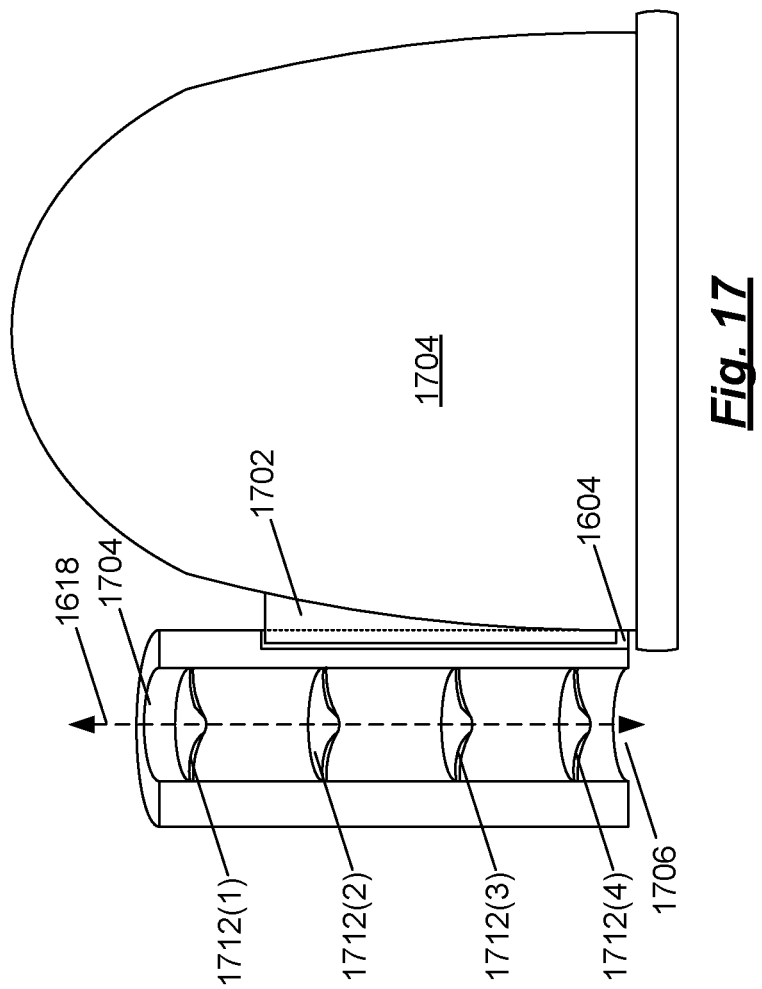
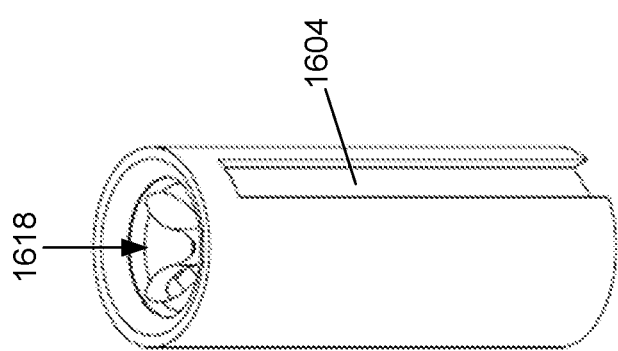

ACCESSORY HOLDER FOR ATTACHING AN ACCESSORY TO A SURFACE

CROSS-REFERENCE TO RELATED APPLICATION

The present application benefits from and claims priority to U.S. Provisional Patent Application Ser. No. 63/199,429, filed Dec. 28, 2020, the entire contents of which are incorporated herein by reference as if fully set forth.

BACKGROUND

The described invention is related to snow skiing accessories. Further, the invention is targeted towards a method and apparatus to be used in conjunction with snow skis and snow skiing poles used by a skier or snowboarder.

Snow skiers often choose to utilize ski poles while skiing. When a skier is in motion progressing down a ski slope, the skier actively grips a ski pole in each hand and plants the tip end of the downhill ski pole in the snow when executing turns in order to improve balance and properly execute ski turns. Additionally, ski poles are leveraged by the skier to help the skier propel himself forward in areas where the ski slope (mountain) is relatively flat.

Ski poles are frequently designed with straps on the handle end of each ski pole so that the skier can insert his hands into the ski pole straps thus minimizing the amount of time that a ski pole is accidently dropped during the operation of skiing with the poles, and to improve the ability of the skier to grip the ski poles.

For a skier to have two free hands while wearing his skis, the skier has the following common options in how he or she may handle his or her ski poles, each with their corresponding complications.

1. The skier can leverage the ski pole straps looped on his wrists to hang the ski pole or drag the ski pole along the snow. However, before boarding a chairlift, the skiers hands are typically required to be removed from the ski pole straps looped around the skiers wrists to minimize the safety risk of the ski pole getting stuck in the chair lift and restraining the skier from exiting the chair lift at the designated unloading zone. The ski pole straps are typically removed from the skier's wrists at the bottom of the ski run while waiting in line to get on the next chair. This can result in a significant amount of time where the ski poles must be held by hand and are at risk at falling on the ground while the skier is waiting to load the chairlift. Additionally, loading oneself onto a chairlift while holding ski poles in one hand minimizes the skier's effectiveness of successfully loading the often crowded and busy chairlifts. Thus, the loading and unloading of chairlifts and associated activities inhibit the utilization of the ski pole straps as a primary method of remaining as hands free as possible when not actively skiing and is not an optimal solution for a skier.

2. When not in motion, the skier can remove his or her wrists from the ski straps and stake his or her ski poles in the snow. The key to this method of achieving a hands-free state is that the skier must remain near to the ski poles when they are temporarily planted. When the skier needs to move again, the skier must pick up the ski poles, carry the ski poles, and re-plant the ski poles in the snow when arriving at the new position. This small but progressive movement is common when waiting in line for a chairlift, thus most skiers will not choose to plant the ski poles into the snow, rather they will choose to actively hold the ski poles continually until boarding the chair lift. This limits the amount of time the skier can remain hands free when not actively needing the ski poles and thus is also not an optimal solution for a skier.

The skier can remove his wrists from the ski straps and hold the skis under his arms or pinch between other body parts in order to maneuver about hands free.

It is very common to see skiers maneuvering in lines or around chair lifts with ski poles pinched under one arm to free his hands. This method has its natural consequences that cause it to be a sub-optimal hands-free solution such as dropping a ski pole or maintaining awkward and stressful body positions over time. In some cases, in order to re-grip the ski poles, the skier will have to intentionally drop the ski poles on the ground and bend over to pick them up again after completing the hands-free task. This option can inconvenience others in close proximity and is obviously also not an optimal solution.

3. The skier can ask a fellow skier to hold his poles temporarily. This method obviously inconveniences a friend, family member, or fellow skier who is obviously already burdened with managing his own ski poles.

As illustrated above, there exists multiple common methods to successfully enable the skier to become hands-free while staying clipped into his ski bindings, however, each common method is riddled with significant inconveniences. As such, the below-described new methods and systems aim to provide a better solution to maximize the quantity and quality of hands-free time for snow skiers. These methods and systems allow the skier (or snowboarder) to easily secure the snow skiing poles to the snow skis/snowboard while the skier is clipped into the skis for the purpose of maximizing the quantity and quality of hands-free operation and to minimize the burden of holding poles in times when active operation of the ski poles is not required.

SUMMARY OF THE EMBODIMENTS

Embodiments described herein pertain to an accessory mounting system. For example, the accessory mounting system may be a ski pole holding method and apparatus which may be permanently fixed to or designed as a part of the ski, ski binding, or ski boot so that a skier can insert the ski poles into the ski pole holding apparatus to permit a skier to perform tasks that require both hands while maintaining near proximity to the ski poles with easy ability to use the ski poles by pulling the poles out of the ski pole holding apparatus. This becomes useful when waiting in line for a chair lift, riding in a chairlift, waiting or resting on the ski slope, or generally performing any actions while wearing skis that is easier or more comfortable when both hands are not actively holding or being strapped to ski poles.

Embodiments disclosed herein is to provide a ski pole holding method and apparatus whereby it will not interfere with the normal use of the skis and ski poles during skiing, but can be become operative as a ski pole holding apparatus at the time the skier does not need to utilize the ski poles and does not desire to hold the ski poles or stay strapped to the ski poles. More particularly, a ski pole holding apparatus that is attached to the skis on the bottom end and has an open channel on the top end with a diameter similar to the diameter of bottom end tip of the ski pole such that the ski pole bottom end tip that typically is inserted into the snow can snuggly fit into the ski pole apparatus attached to the skis. The open top channel on the ski pole holding apparatus has a depth that is long enough to sufficiently support the ski pole at the desired angle normal to the skis and sufficient to keep the ski poles securely attached to the ski without the risk of the ski pole easily falling out of the ski pole holding apparatus.

BRIEF DESCRIPTION OF THE FIGURES

FIG. 16 shows an accessory holder with base portion in side-mount location, in an embodiment.

FIG. 17 shows the accessory holder of FIG. 16 mounted to a ski-boot, in an embodiment.

DETAILED DESCRIPTION OF THE EMBODIMENTS

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The drawings depict an embodiment of a ski pole holding apparatus that is affixed to each ski such that a ski pole can be inserted vertically to the top end ski pole holding apparatus. Embodiment as described below are not meant to limit the possible and probable enhancements that would improve the aesthetic look or functionality of the apparatus and method. There exist other embodiments whereby the method of easily securing the ski pole to the ski (or snowboard) for the purpose of maximizing the hands-free capability of the skier is integrated into the design of the skis, ski bindings, or ski boots. Although not illustrated here, the integration of the method to the design of the skis, ski bindings, or ski boots are understood to be fully covered and protected by this method.

Figure 1:
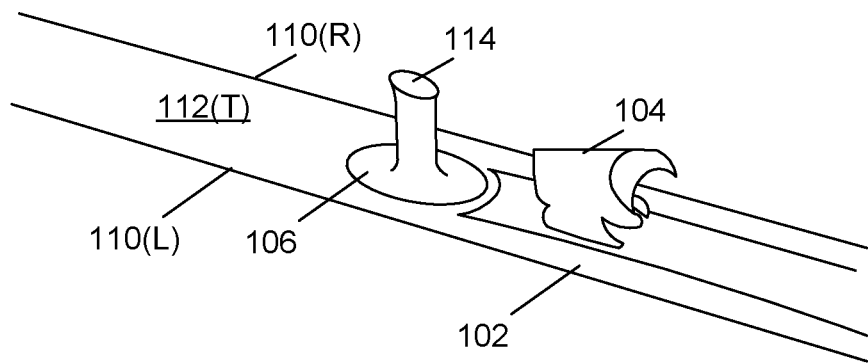
FIG. 1 is an isometric view of a ski 102 and ski binding assembly 104 with an accessory holder 106 affixed to the ski 102

FIG. 1 is an isometric view of a ski 102 and ski binding assembly 104 with an accessory holder 106 affixed to the ski 102 with clearance from the critical ski surfaces (such as the ski binding assembly 104, and edges 110(L) and 110(R) of ski 102). The accessory holder 106 is shown mounted to the top surface 112(T) of the ski by an adhesive substance in front of the toe binding assembly 104. The placement of the accessory holder 106 is not limited to that shown, and may be affixed to the ski 102 at any preferable location on the ski 102 such that the accessory holder 106 has achieved clearance from critical ski surfaces such as edges 110, and binding assembly 104. The ideal location on the ski for the accessory holder 106 affixed to the ski 102 would be a location that minimizes interference with the normal operation of the skis and ski poles and a location that maximizes the user's ability to quickly and easily secure and remove the ski poles from an open top channel 114 of the accessory holder 106 that accepts the tip of the ski poles on or within the accessory holder 106. Thus, open top channel 114 has a dimension (e.g., diameter) sized and shaped to receive a ski pole.

Figure 2:
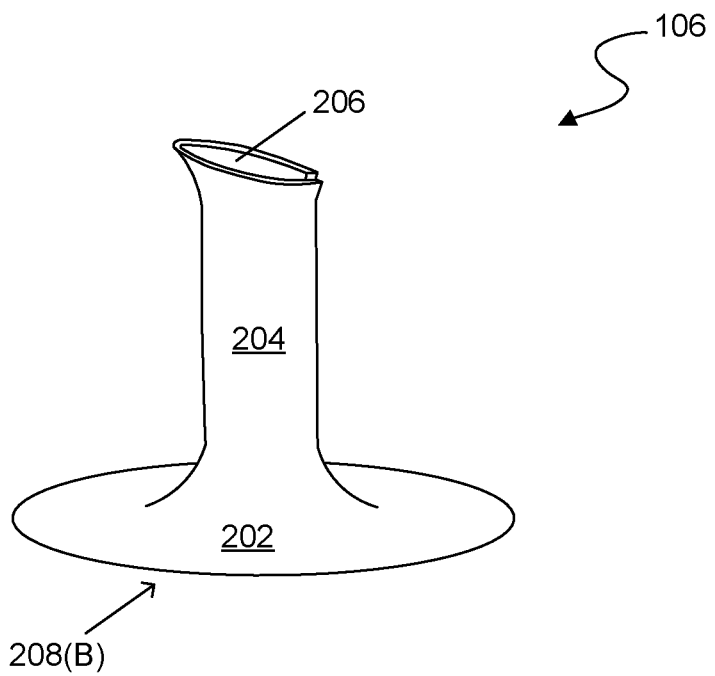
FIG. 2 shows the accessory holder 106 in further detail, in an embodiment.

FIG. 2 shows the accessory holder 106 in further detail, in an embodiment. The accessory holder 106 includes a base portion 202, an extension portion 204 that defines an open top channel 206. Bottom surface 208(B) of base portion 202 may include an adhesive layer for securing the accessory holder 106 to the ski, or other surface such as a snowboard, sled, or non-ski sport device such as a wakeboard, wake ski, car roof, car hood, car dash, etc.

Figure 3:
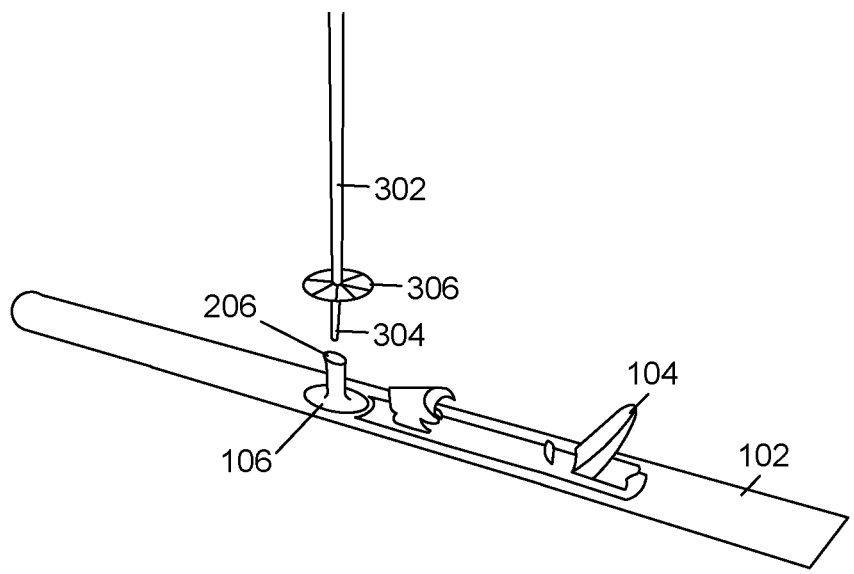
FIG. 3 is an isometric view of ski and ski binding assembly with the accessory holder affixed thereto.

FIG. 3 is an isometric view of ski 102 and ski binding assembly 104 with the accessory holder 106 affixed thereto with clearance from the critical ski surfaces and a ski pole 302 with corresponding ski pole tip 304 and ski pole basket 306. In this figure, the ski pole tip 306 has not yet been secured to the accessory holder 106 affixed to the ski 102. When the skier desires to enter a hands-free state, the skier will guide the ski pole tip 306 into the open top channel 206 of the accessory holder 106. The ski pole tip 306 slides into the open top channel 206 until the ski pole basket 306 has reached the uppermost part of the accessory holder 106 (e.g. top surface of the extension 204), until the ski pole tip 306 has reached the bottom of the open top channel 206, or until enough friction between open top channel 206 and the ski pole tip 306 has been achieved.

Figure 4:
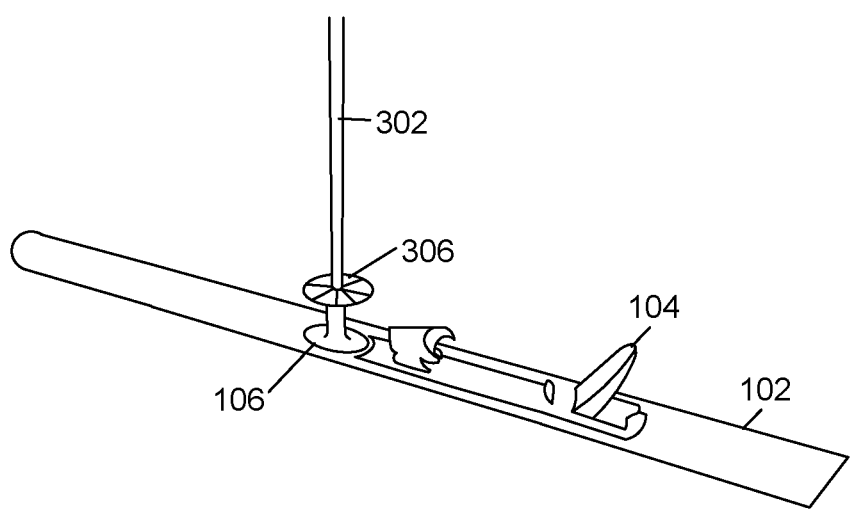
FIG. 4 is an isometric view of the ski pole properly placed in the accessory holder.

FIG. 4 is an isometric view of the ski pole 302 properly placed in the accessory holder 106. The ski pole tip 304 is no longer visible as it has fully and securely entered into the open top channel 206 with the ski pole basket 306 above the top of the accessory holder 106 affixed to the ski 102. In this figure, the skier can become hands-free as the entire mass of the ski pole 302 is supported and held upright by the accessory holder 106 affixed to the ski 102. Because of the depth and width of the open top channel 206 in relation to the ski pole tip 306, the ski pole 302 is sufficiently secured to the accessory holder 106 affixed to the ski 102 with little risk of the ski pole 302 falling out of the accessory holder 106 (e.g., out of open top channel 206) unintentionally. In other words, the open top channel 206 may have a diameter (or width or other dimension) that is smaller than a standard ski-pole tip 306.

FIGS. 3 and 4 show a single accessory holder 106 mounted to the skis 102 in front of binding assembly 104. However, the accessory holder 106 may also be mounted behind the binding assembly 104 without departing from the scope hereof. Additionally, more than one accessory holder 106 may be mounted to the skis 102, such as one in front of the bindings 104 and one behind the bindings 104.

Figure 5:
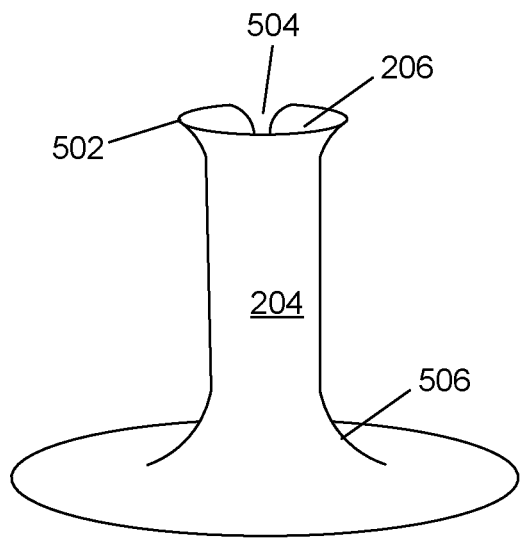
FIG. 5 also shows an optional rear open slit in accessory holder of FIGS. 1-4.
Figure 6:
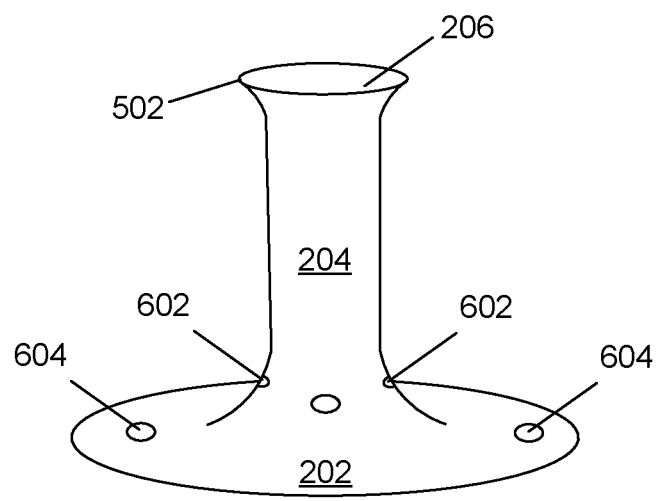
FIG. 6 also shows optional securing holes that may be defined by base portion of accessory holder of FIGS. 1-5.

FIGS. 5 and 6 are side view of the accessory holder 106 from a slightly vertical perspective with various optional features, in embodiments. The accessory holder 106 is shown to have the open top channel 206 to accept the tip 304 of the ski pole 302 (or another accessory), where the open top channel 306 defined by extension 204 of adequate depth and width to secure the ski pole tip 304. In an embodiment, the accessory holder 106 may be sized and shaped with aerodynamic curvatures to minimize the snow build up. Additionally, the open (or top) end 502 of the accessory holder 106 may have a wider diameter than a lower portion thereof, as shown in FIG. 5. The wider diameter may provide the skier an easier ability to guide the ski pole tip 306 into the open top channel 206. The open top channel, to accept the tip 304 of the ski pole 302, may or may not be horizontal to the ski plane in order to improve the ability of the skier to successfully mount the ski pole tip 304 into the open top channel 206.

FIG. 5 also shows an optional rear open slit 504. The rear open slit 504 may expand and accept large ski pole tip diameters. Using this rear open slit 504 allows for many different size ski pole tip diameters, or a variety of other accessories (such as camera mount poles that may be of other diameters than a standard ski pole, etc.) to successfully be at attached to the accessory holder 106. This rear open slit 504 enables the open top channel 206 to be designed at a smaller diameter than the ski pole tip 304 diameter to force an intentional interference between the ski pole tip 304 and the open top channel 206 to further enhance the ability of the accessory holder 106 to secure the ski pole 302. Additionally, the rear open slit 504 can provide the flexibility within the accessory holder 106 to keep debris or snow build up within the open top channel 206 from inhibiting the ski pole tip 304 from penetrating to the desired depth within the open top channel 206. More than one slit 504 may be included, and the slit may be located at other locations on extension 204, such as the front, sides, etc. Additionally, there may exist other methods to enhance the ability of the open top channel 206 to effectively secure the ski pole 302 (or other accessory). The illustrated embodiment is understood to encompass all possible securing methods of the ski pole 320 to the accessory holder 106 covered by the systems and methods described in this document.

As shown in FIGS. 5 and 6 (and 9-12), the extension portion 204 may include smooth aerodynamic curvatures 506 to minimize snow buildup around the base 202 of the accessory holder 106.

In the embodiment shown in FIG. 6, the rear open slit 504 is absent and replaced with channel relief holes 602 that reduce snow buildup in the channel 206, or otherwise allow melted moisture to escape channel 206. Thus, the purpose of these holes is to exhaust snow, debris, and/or air out of the open top channel 206 as the ski pole tip 304 is entering into the accessory holder 106. Three holes 602 are shown (two of which are labeled), but there may be more or fewer holes 602 without departing from the scope hereof. The channel relief holes 602 may be round, square, or any other shape or shape that allows for snow air or water to exhaust out of the channel 206. Additionally, in at least some embodiments, the accessory holder 106 includes both the rear open slit 504 to expand for large ski pole tip diameters with the channel relief holes 602 (or any other combination of features of the accessory holders discussed herein).

FIG. 6 also shows optional securing holes 604 that may be defined by base portion 202 of accessory holder 106. Securing holes 604 may be in addition to, or alternatively to, the adhesive layer on the bottom surface of base portion 202.

Figure 7:
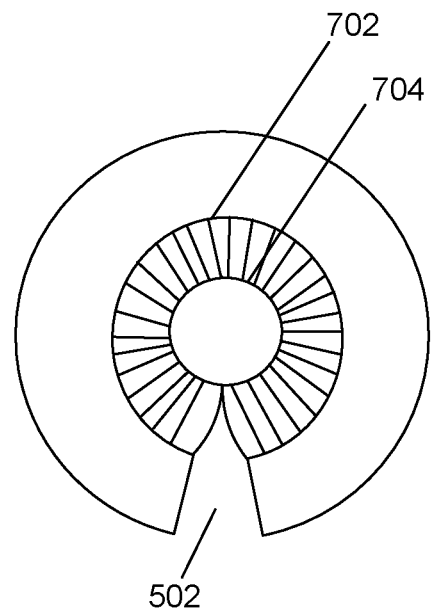
FIG. 7 is a top view of an accessory holder according to any of FIGS. 1-5, in an embodiment.

FIG. 7 is a top view of the accessory holder 106. FIG. 7 is similar to the embodiment shown in FIG. 5. The base 202 may be round, elliptical, oval, triangular, square, rectangular, or any other shape or pattern from a top view such that the base 202 can be sufficiently mounted and adhered/screwed to the ski 102 and sufficiently support the accessory holder 106 with and without the load of the ski pole 302. This view is representative of the perspective that a skier may likely see when looking down to accessory holder 106. The open top channel 206, to accept the tip 304 of the ski pole 302 is target area that the skier will intend to insert the ski pole tip 302. Due to the relatively small target area of the open to channel 206, the ski pole tip 304 will be effectively guided by the wide funnel ski pole tip entry diameter 702 during insertion of the ski pole tip 304 into the open top channel 206. In this preferred embodiment, the rear open slit 504 may expand as the ski pole tip 304 enters the open top channel 206 further ensuring that the ski pole 302 will remain in the accessory holder 106 until the skier removes the ski pole 302 out of the accessory holder 106 for use. FIG. 7 also shows an optional feature where the diameter 702 at the top of channel 206 (e.g., proximate the opening of channel 206) is greater than a second diameter 704 at the bottom of channel 206.

Figure 8:
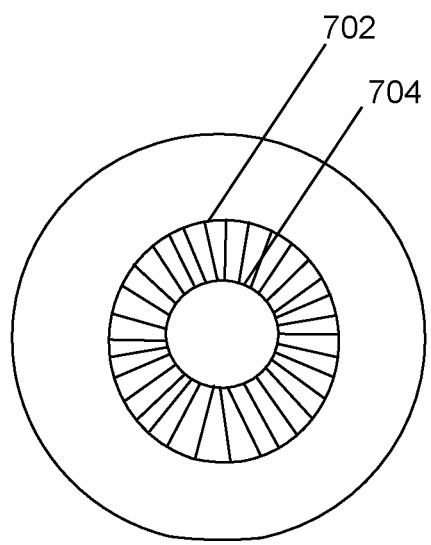
FIG. 8 is a top view of the accessory holder according to any of FIGS. 1-4 and 5, in an embodiment.

FIG. 8 is a top view of the accessory holder 106 like FIG. 7, however, without the rear open slit 504. This view is representative of the perspective that a skier may likely see when looking down to an accessory holder 106. The open top channel 206 to accept the tip 304 of the ski pole 302 is target area that the skier will intend to insert the ski pole tip 304. Due to the relatively small target area of the open to channel 206, the ski pole tip 304 will be effectively guided by the first diameter 702, which is larger than a lower diameter 704, during insertion of the ski pole tip 304 into the open top channel 206. The open top channel 206 snow buildup relief holes 602 of FIG. 6 are not visible in this view as the wide funnel open top channel 206 shields them from view in this embodiment.

Figure 9:
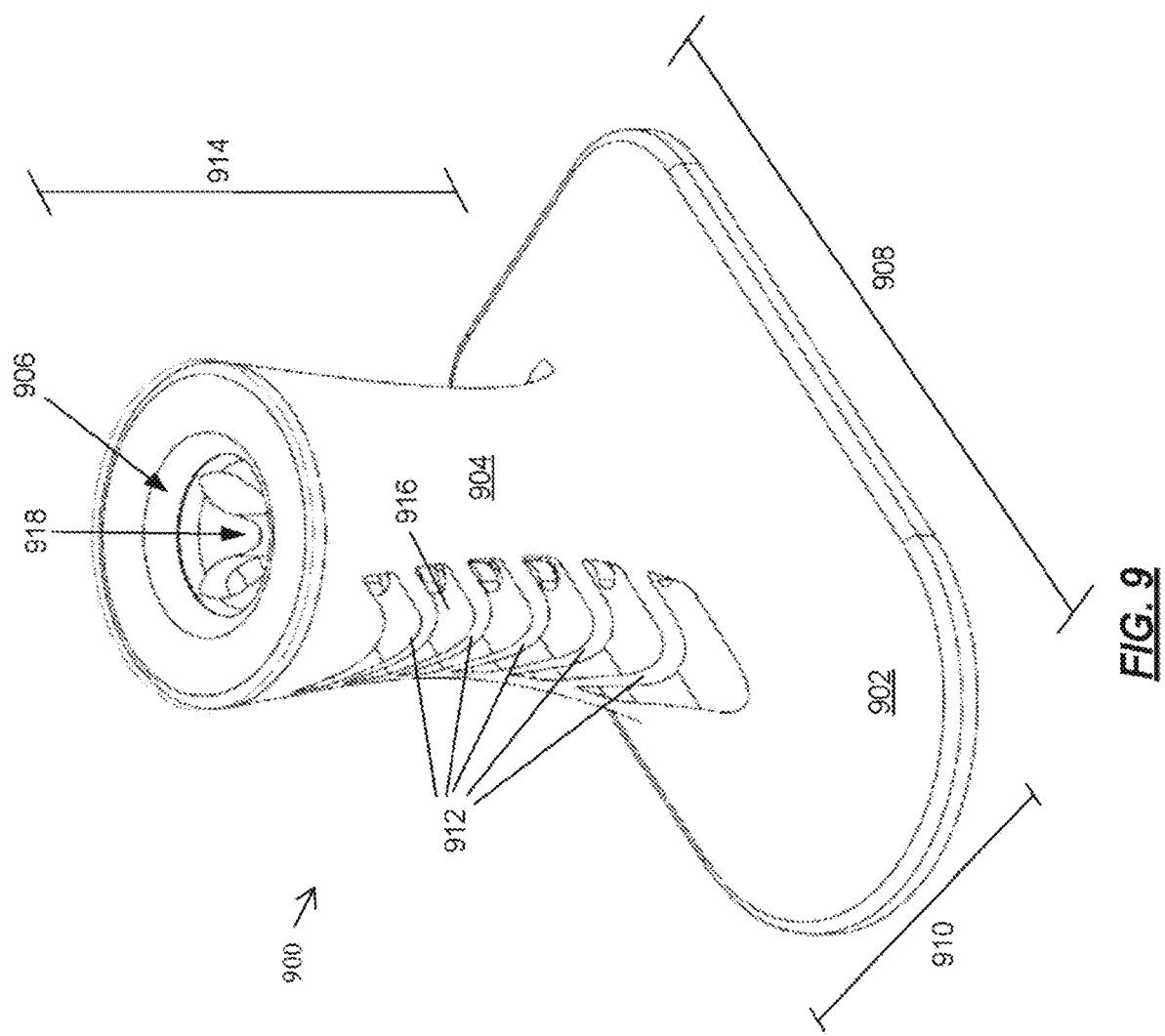
FIGS. 9-12 show an accessory holder, in an embodiment.
Figure 10:
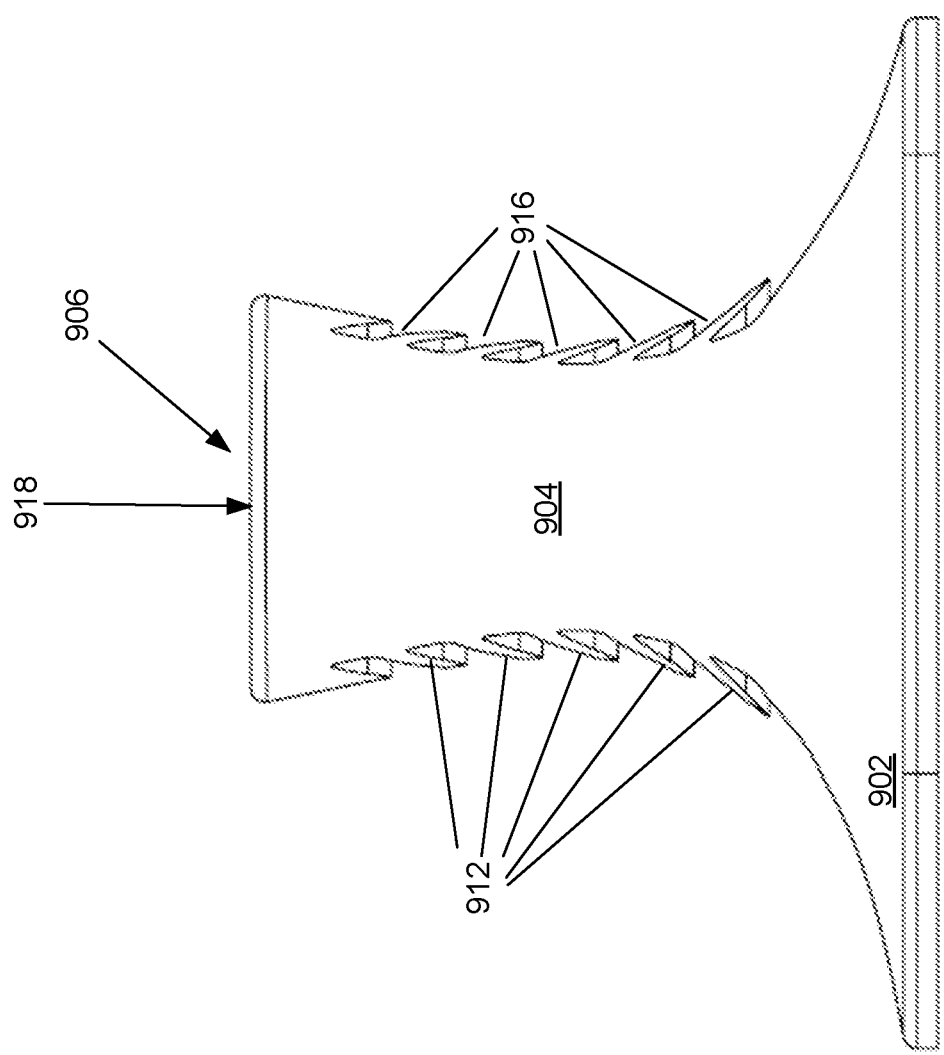
Figure 12:
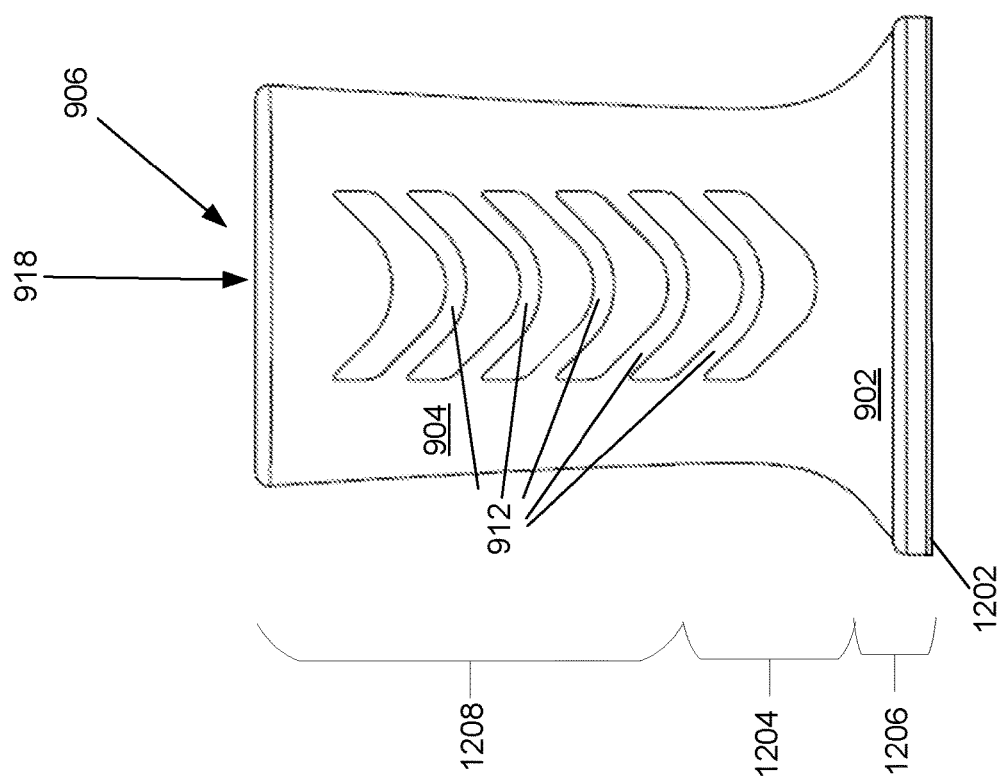
Figure 11:
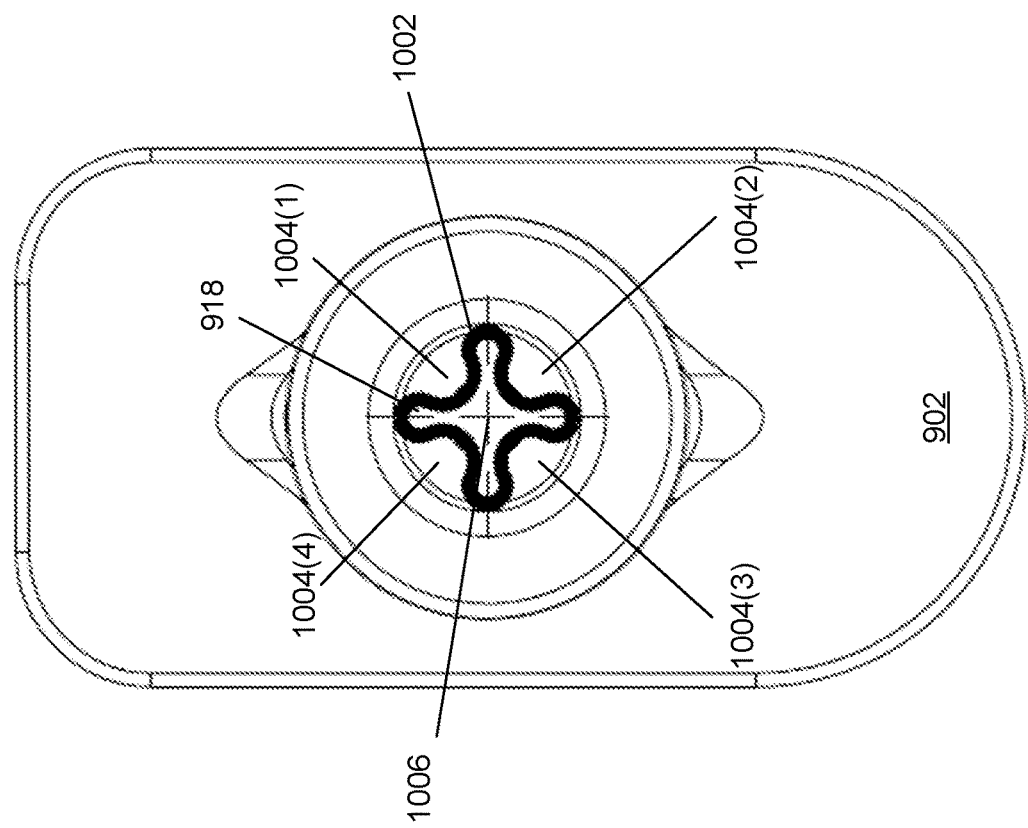

FIGS. 9-12 show an accessory holder 900, in an embodiment, where FIG. 9 is a perspective view, FIG. 10 is a side elevation view, FIG. 11 is a top plan view, and FIG. 12 is a front elevation view thereof. Accessory holder 900 is an example of accessory holder 106, discussed above, and thus any feature discussed with respect to accessory holder 106 may apply thereto, and vice versa, unless otherwise indicated.

Accessory holder 900 includes base portion 902 (which is an example of base portion 202), extension 904 (which is an example of extension 204), and open top channel 906 (which is an example of open top channel 206). Base portion 902 is shown having a length 908 and width 910. Length 908 and width 910 may be selected so as to maintain clearance from the critical ski surfaces (such as the ski binding assembly 104, and edges 110(L) and 110(R) of ski 102), as discussed above. In one example, the length 308 is between 3-5 inches, such as 3.75 inches, and the width 310 is between 1-3 inches, such as 2 inches. Other lengths, widths, and heights may be used without departing from the scope hereof.

Accessory holder 900 is shown with a plurality of channel trays 912 that, collectively, form open top channel 906. Channel trays 912 are spaced vertically along a height 914 of extension 904. The space 916 defined between two adjacent channel trays 912 serves as an example of relief holes 602 discussed above.

Each channel tray 912 defines an aperture 918 therein. The plurality of channels 918 (one on each tray 912) collectively defines channel 906. Aperture 918, in the embodiment shown in FIGS. 9-12 is shown as a "clover leaf" shape in horizontal cross section, as best illustrated in FIG. 11. The "clover leaf" shape 1002 is defined, at each tray 912, as four rounded flanges 1004(1)-(4) extending toward the center 1006 of aperture 918. It should be appreciated, however, that any shape other than the "clover leaf" may be used without departing from the scope hereof, such as circular, triangular, square, star, etc. Further, in an embodiment, accessory holder 900 does not include a plurality of trays, but instead only includes the channel 906 defined by a clover leaf or other shape.

As discussed above, the aperture 918 of each tray 912 may be aligned (e.g., the centers 1006 of each aperture may be aligned vertically). However, each aperture of each tray 912 may differ in dimension from other trays such that a respective dimension of the apertures 918 gets smaller at each tray 912 towards the base portion from an open end of the channel. For example, the aperture size may get gradually smaller towards the bottom of the accessory holder 900.

In an embodiment, such as that shown in FIGS. 9-12, each tray 912 may have a "U" shape when viewed from at least one of a front, back, or side of the accessory holder. This provides an advantage that the flanges 1004 don't need to bend as much to "grip" the accessory inserted in to channel 906. For comparison, if the trays 912 are fully horizontal, then the flanges 1004 may need to bend a full 90 degrees if the inserted accessory has a diameter that matches the diameter of the aperture 918. Thus, the "U" shape increases the lifespan of the accessory holder 900.

FIG. 12 also shows adhesive layer 1202. Adhesive layer 1202 may be any adhesive. In one particular embodiment, the adhesive layer 1202 is a 3M VHB tape. Adhesive layer 1202 may be an adhesive layer that strengthens its bond as temperatures get colder. Adhesive layer may be non-adhesion-based couplings, such as hook and loop affixing members, fasteners (screws, nails, staples), etc.

FIG. 12 also shows an optional feature where a middle portion 1204 has a first thickness, a bottom portion 1206 has a second thickness, and a third portion 1208 has a third thickness. The middle portion 1204 is between the bottom and top portions 1206, 1208. The first thickness is less than the second thickness and the third thickness. The smallest thickness may be approximately ¼ of the overall height 914 of accessory holder 900, or of the height of the extension portion 904. This configuration provides the advantage that, if the ski pole is to be hit when mounted in the accessory holder 900, the accessory holder 900 is to be flexible at the location of the middle portion 1204 to bend in the middle of the device versus putting all of that strain on the bond at adhesive layer 1202 (between the accessory holder 900 and the ski 102 or snowboard). This flexibility makes it adhere to the ski with minimized bond failure.

Figure 13:
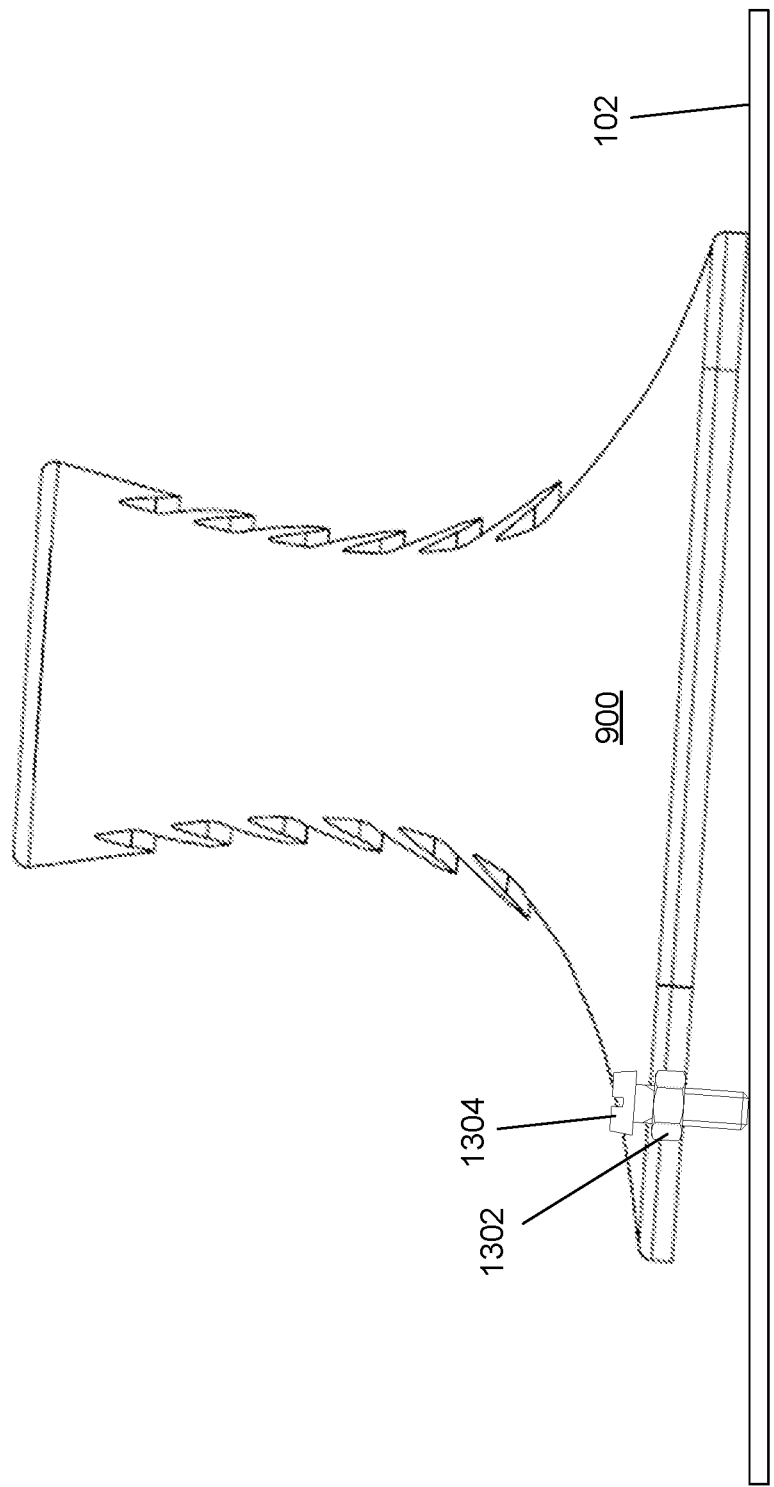
FIG. 13 shows the accessory holder, with a further internal nut mounted to the bottom surface of the base portion, in an embodiment.

FIG. 13 shows the accessory holder 900, with a further internal nut 1302 mounted to the bottom surface of the base portion 902, in an embodiment. Internal nut 1302 may be accessible from the top of the accessory holder 900 and used to pry the accessory holder 900 from ski 102 after adhering thereto. Actuation of a bolt 1304 is operable to raise a side of the accessory holder 900 with respect to a mounted surface of ski 102. For example, as a bolt 1304 is screwed into nut 1302, one side of the accessory holder 900 is pried upwards with respect to ski 102. A user may then grip an edge and pull the accessory holder 900 from the ski 102. Alternatively, or additionally, a small wire or string may be included that is capable of cutting through the adhesive layer 1202 to remove the holder 900 from ski 102.

Figure 14:
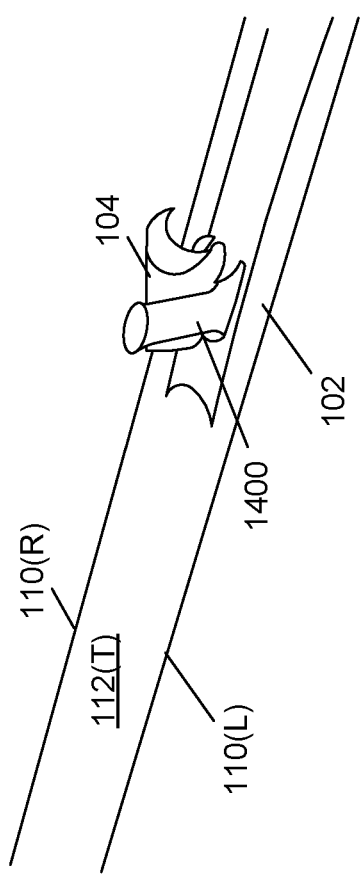
FIG. 14 shows an accessory holder integral to, or attached to, a ski binding, in an embodiment.

FIG. 14 shows an accessory holder 1400 integral to, or attached to, a ski binding, in embodiment. Accessory holder 1400 includes any of the above-described features of accessory holder(s) 106 and/or 900, but the extension or base portion is attached to or integral with a ski binding. Thus, the above discussion of accessory holder(s) 106 and/or 900 applies equally as well to accessory holder 1400 in that any feature described with respect to accessory holder(s) 106 and/or 900 may be included in accessory holder 1400. The extension 1402 may extend to the left or right of ski-binding 104. Furthermore, the extension 1402 is shown at a forward angle with respect to the ski, such that the pole 302 when inserted therein is at a forward angle, but the extension may be at other angles, such as normal to the ski and rearward without departing from the scope hereof. To attach to binding 104, the base portion of the accessor holder 1400 may couple between the ski 102 and binding 104.

Figure 15:
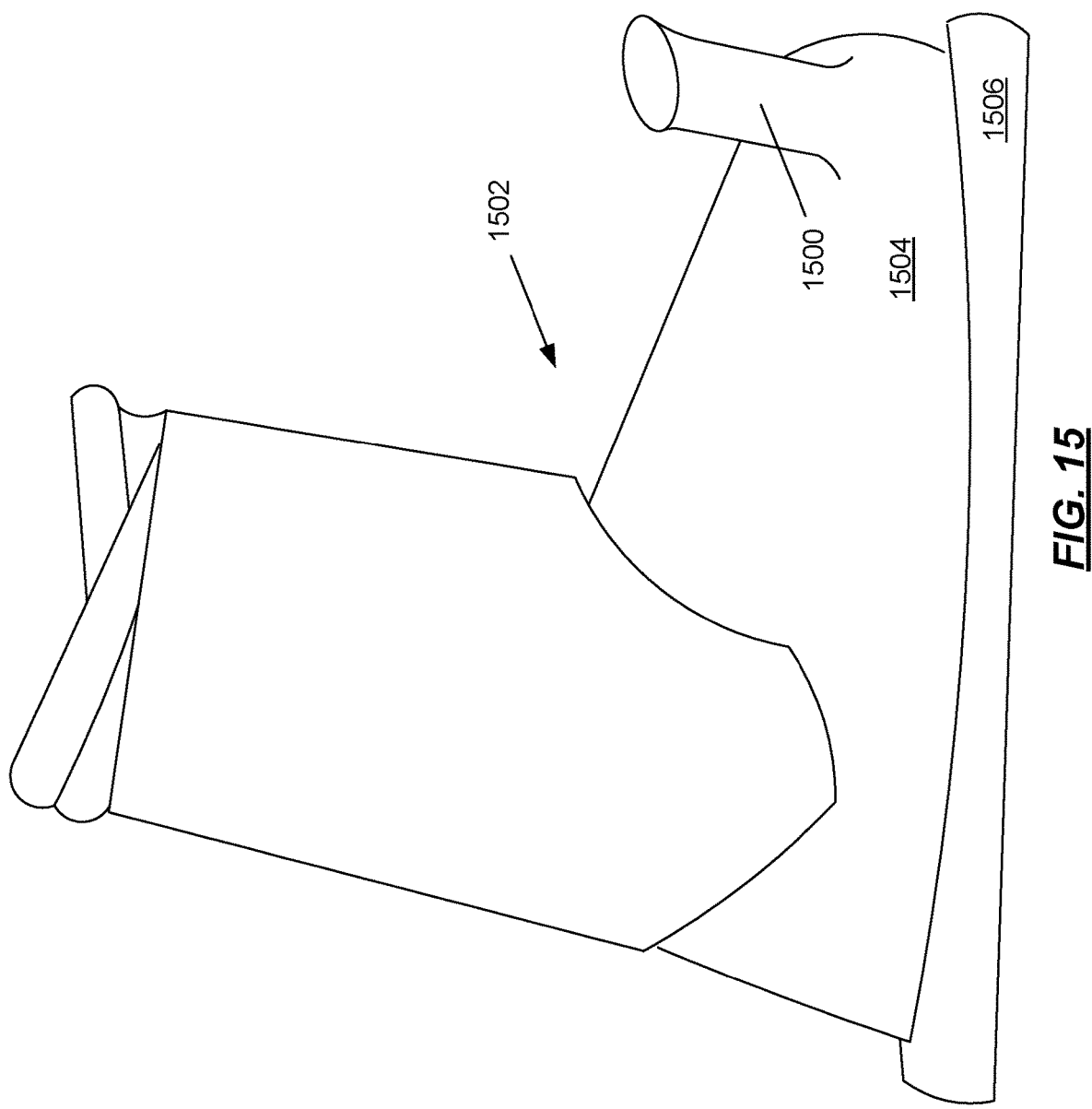
FIG. 15 shows an accessory holder integral to, or attached to, a ski boot, in an embodiment.

FIG. 15 shows an accessory holder 1500 integral to, or attached to, a ski boot, in embodiment. Accessory holder 1500 includes any of the above-described features of accessory holder(s) 106 and/or 900, and/or 1400, but the extension or base portion is attached to or integral with a ski boot 1502. Thus, the above discussion of accessory holder(s) 106 and/or 900 and/or 1400 applies equally as well to accessory holder 1500 in that any feature described with respect to accessory holder(s) 106 and/or 900 and/or 1400 may be included in accessory holder 1500. The extension 1502 may extend to the left or right of ski-binding 104. Furthermore, the extension 1502 is shown at a forward angle with respect to the ski boot, such that the pole 302 when inserted therein is at a forward angle, but the extension may be at other angles, such as normal to the ski and rearward without departing from the scope hereof. In one embodiment, to attach to boot 1502, the base portion of the accessor holder 1500 may couple between the ski boot shell 1504 and toe lug 1506.

FIG. 16 shows an accessory holder 1600 with base portion in side-mount location, in an embodiment. FIG. 17 shows a simplified cross-section of the accessory holder 1600 of FIG. 16 mounted to a ski-boot, in an embodiment. FIGS. 16 and 17 are best viewed together with the following description.

Accessory holder 1600 includes any of the above-discussed features of accessory holder 106, 900, or 1400, but instead of including base portion 202 at the bottom of the accessory holder, it includes a side-mount configuration. The side-mount configuration is defined by a side attachment 1604. Side-attachment 1604 is shown as a groove or channel indented into the side profile of the accessory holder 1600. The side attachment 1604 couples with a holder mount 1702 that is coupled to the equipment 1704 to which the accessory holder 1600 is mounted to. Holder mount 1702 is an example of a base portion as discussed above. In the embodiment shown in FIG. 17, the equipment is a ski-boot. However, the holder mount 1702 may be coupled to other equipment including, but not limited to, ski or snowboard bindings, watersport equipment, boats, etc.

As shown in FIG. 16, the accessory holder 1600 includes an extension 1602 having an open top channel 1618, that is similar to open top channel 918. FIG. 16 shows the clover-leaf shape similar to clover leaf shape 1002. FIG. 16, however, does not show a plurality of trays spaced apart to create channels, like channels 916. It should be appreciated that the holder 1600 may include a plurality of trays 1712 that are spaced apart (where each tray 1712 is similar to tray 912), but the outer surface of the accessory holder 1600 may be closed so that there are not the space (like space 916) defined between two adjacent channel trays 1712 serves as an example of relief holes as discussed above. There are four trays 1712(1)-(4) shown, but there may be more or fewer trays without departing from the scope hereof.

Instead of space between each tray 1712 to serve as relief holes, the channel 1618 may include an open top 1706 and an open-bottom 1708 such that snow can exhaust out the bottom of the accessory holder 1600, as shown in FIG. 17. Moreover, the accessory holder 1600 may also include an open slit (similar to open slit 504). Open slit may be located in a different location from side attachment 1604 so as to not interfere with the coupling between for side attachment 1604 and holder mount 1702 while still allowing the channel 1618 to expand depending on the dimensions of the attachment secured therewithin.

Any of the above-discussed accessory holders (e.g., accessory holder 106, 900, 1400, 1500, or 1600) may be composed of any material, such as metal, silicon, plastic, wood, etc. In one particular embodiment, the accessory holders discussed herein are made of a thermoplastic elastomer by the name Hytrel®, based on block copolymer technology and having a shore hardness of 40D. The accessory holders herein may be manufactured by molding (either injection, or press molded), or via additive manufacturing (3D printing).

The above-discussed accessory holders are described, predominantly, for holding ski poles. However, it should be appreciated that other accessories may be secured therewithin, without departing from the scope hereof. For example, camera mounts, decorative devices (such as car hood ornaments), water bottle holders, etc. may be secured to the ski or other mounted surface, using the above-described accessory holders.

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. An accessory holder, comprising:
a base portion configured to mount to a mounting surface;
an extension coupled to the base portion and having a channel defined therein, the channel comprising at least one tray within the channel and having an aperture defined thereby corresponding to the channel;
wherein the channel is configured to receive an accessory.

2. The accessory holder of claim 1, the mounting surface being a component of a snow sport equipment.

3. The accessory holder of claim 2, the channel having a dimension sized and shaped to receive a ski pole.

4. The accessory holder of claim 1, the mounting surface being a portion of a ski or snowboard in front of a binding assembly on the ski or snowboard.

5. The accessory holder of claim 1, the channel having a clover-leaf shape in horizontal cross section.

6. The accessory holder of claim 1, the at least one tray comprising a plurality of trays each having an aperture therein, wherein the apertures are vertically aligned.

7. The accessory holder of claim 1, the at least one tray comprising a plurality of trays each having an aperture therein, wherein a respective dimension of each aperture gets smaller at each tray towards the base portion from an open end of the channel.

8. The accessory holder of claim 1, the at least one tray comprising a plurality of trays spaced apart from one another.

9. The accessory holder of claim 1, the at least one tray having a "U" shape when viewed from at least one of a front, back, or side of the accessory holder.

10. The accessory holder of claim 1, a first dimension at an open end of the channel being greater than a second dimension of the channel towards the base portion.

11. The accessory holder of claim 1, further comprising a nut embedded within the base portion and accessible with a bolt from a top of the base portion, wherein actuation of the bolt is operable to raise a side of the accessory holder with respect to a mounted surface.

12. The accessory holder of claim 1, the accessory holder defining a middle portion having a first thickness, a bottom portion having a second thickness, and a top portion has a third thickness; wherein the middle portion is between the top and bottom portions, and the first thickness is less than the second and third thicknesses.

13. The accessory holder of claim 1, further comprising an adhesive layer on an opposite side of the base portion from the extension.

14. The accessory holder of claim 1, the extension having a slot that allows the channel to expand when an accessory is inserted into the channel.

15. The accessory holder of claim 1, further comprising space adjacent the at least one tray providing a relief hole for snow to exhaust through.

* * * * *